United States Patent
Surve et al.

(10) Patent No.: US 12,129,915 B2
(45) Date of Patent: Oct. 29, 2024

(54) LOCKING DIFFERENTIAL ASSEMBLY

(71) Applicant: Eaton Intelligent Power Limited, Dublin (IE)

(72) Inventors: Rupesh Madhukar Surve, Pune (IN); Aniket Khanderao Yadav, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/263,842

(22) PCT Filed: Feb. 3, 2022

(86) PCT No.: PCT/EP2022/025038
§ 371 (c)(1),
(2) Date: Aug. 1, 2023

(87) PCT Pub. No.: WO2022/167153
PCT Pub. Date: Aug. 11, 2022

(65) Prior Publication Data
US 2024/0117870 A1    Apr. 11, 2024

(30) Foreign Application Priority Data
Feb. 4, 2021   (IN) .............................. 202111004833

(51) Int. Cl.
*F16H 48/24*  (2006.01)
*F16H 48/08*  (2006.01)
*F16H 48/34*  (2012.01)

(52) U.S. Cl.
CPC ......... *F16H 48/24* (2013.01); *F16D 2300/18* (2013.01); *F16H 48/08* (2013.01); *F16H 2048/346* (2013.01)

(58) Field of Classification Search
CPC ................ F16H 48/24; F16H 48/34–2048/346
See application file for complete search history.

(56) References Cited

U.S. PATENT DOCUMENTS 7,022,040 B2 * 4/2006 DeGowske ............. F16H 48/10
                                              188/161
7,264,568 B2   9/2007 Ludwig et al.
(Continued)

FOREIGN PATENT DOCUMENTS

CN    210003771    1/2020
EP    1908621     4/2008
(Continued)

OTHER PUBLICATIONS

International Search Report and Written Opinion for Application No. PCT/EP2022/025038 mailed Apr. 21, 2022.

*Primary Examiner* — Ernesto A Suarez
*Assistant Examiner* — James J Taylor, II
(74) *Attorney, Agent, or Firm* — Merchant & Gould P.C.

(57) ABSTRACT

A locking differential assembly includes a differential case defining an axis of rotation. A lock collar is selectably engageable with a first side gear to selectably prevent the first side gear and a second side gear from rotating relative to the differential case. A coil disposed at an end of the differential case. An armature selectably magnetically actuatable by the coil. An armature position indicator arm rigidly attached to the armature for simultaneous movement with the armature. At least two relay pin assemblies are each connected to the lock collar and connected to the armature to space the lock collar a predetermined distance from the armature for translation parallel to the axis of rotation. A sensor connected to the differential case to detect a proximity of the armature position indicator arm to the sensor and to output an electrically detectable signal indicative of an engagement status of the lock collar.

20 Claims, 6 Drawing Sheets

(56) References Cited

U.S. PATENT DOCUMENTS

| | | | |
|---|---|---|---|
| 7,862,462 B2 | 1/2011 | Fusegi | |
| 9,556,945 B2* | 1/2017 | Fox | F16H 48/22 |
| 9,625,026 B2 | 4/2017 | Cochren et al. | |
| 9,657,827 B2 | 5/2017 | Gopal et al. | |
| 9,933,060 B2 | 4/2018 | Cochren et al. | |
| 10,920,866 B2* | 2/2021 | Gostin, Jr. | B60K 23/0808 |
| 11,326,679 B2 | 5/2022 | Borgaonkar et al. | |
| 11,396,935 B2 | 7/2022 | Allen | |
| 2007/0197338 A1 | 8/2007 | Fusegi | |
| 2019/0226566 A1* | 7/2019 | Hillman | F16H 48/40 |
| 2019/0383378 A1* | 12/2019 | Surve | F16H 48/34 |
| 2020/0116245 A1* | 4/2020 | Fritz | B60K 17/16 |

FOREIGN PATENT DOCUMENTS

| | | |
|---|---|---|
| JP | 2004-208460 A | 7/2004 |
| WO | 2007069042 | 6/2007 |
| WO | 2013176866 | 11/2013 |
| WO | 2014116802 | 7/2014 |
| WO | 2015060890 | 4/2015 |
| WO | 2015/078488 A1 | 6/2015 |
| WO | 2017/100550 A1 | 6/2017 |
| WO | 2018/057437 A1 | 3/2018 |
| WO | 2018232262 | 12/2018 |
| WO | 2019/238272 A1 | 12/2019 |
| WO | 2020/094252 A1 | 5/2020 |
| WO | 2020144090 | 7/2020 |

* cited by examiner

LOCKING DIFFERENTIAL ASSEMBLY

CROSS-REFERENCE TO RELATED APPLICATIONS

This application is a National Stage Application of PCT/EP2022/025038, filed on Feb. 3, 2022, which claims the benefit of Indian Provisional Patent Application No. 202111004833 filed on Feb. 4, 2021, the contents of which are incorporated herein by reference in their entirties. To the extent appropriate, a claim of priority is made to each of the above disclosed applications.

BACKGROUND

A locking differential may have an additional capability compared to a conventional "open" automotive differential. A vehicle with a locking differential may experience increased use of traction at the drive wheels compared to a vehicle with an "open" differential. Use of traction may be increased by restricting each of the two drive wheels on an axle to the same rotational speed without regard to the available traction or the road path taken at each wheel. The locking differential causes both wheels on an axle to turn together as if on a common axle shaft.

An open differential, or unlocked locking differential allows each wheel on an axle to rotate at different speeds. When a vehicle negotiates a turn, the wheel on the smaller (inner) radius rotates more slowly than the wheel on the larger (outer) radius. Without the unlocked or open differential, one of the tires may scuff in a turn. With an open differential, when one wheel of an axle is on a slippery road surface, the wheel on the slippery surface may tend to spin while the other wheel may not have enough torque applied to it to move the vehicle. For example, some vehicles with open differentials may be unable to climb a hill with wet ice under one of the wheels no matter how dry the pavement is under the other wheel (this may be known as a split-mu surface).

In contrast, a locked differential forces wheels on both sides of the same axle to rotate together at the same speed. Therefore, each wheel can apply as much torque as the wheel/road traction and the powertrain capacity will allow. In the example of the vehicle on the hill with the split-mu surface, a locked differential may allow the vehicle to climb the hill that is impossible for an otherwise identical vehicle to climb with an open differential. Locking differentials may also provide better traction that leads to improved vehicle performance under certain conditions, for example in drag racing, or snow plow operations.

Some vehicles have differentials that may be reconfigured from an unlocked state to a locked state. Such vehicles may be operated with the differential in the unlocked state for normal conditions, for example, to prevent tire scuffing in turns, and reconfigured for operation with a locked differential when wheel slippage is encountered.

SUMMARY

A locking differential assembly includes a differential case defining an axis of rotation. A lock collar is selectably engageable with a first side gear to selectably prevent the first side gear and a second side gear from rotating relative to the differential case. A coil is disposed at an end of the differential case. An armature is selectably magnetically actuatable by the coil. The armature includes an armature flange. An armature position indicator arm is rigidly attached to the armature for simultaneous movement with the armature. At least two relay pin assemblies are each connected to the lock collar and connected to the armature to space the lock collar a predetermined distance from the armature for translation parallel to the axis of rotation. Each relay pin assembly can include a relay pin having a pin flange, a shoulder bolt having a bolt flange, a first washer and a second washer. The first and second washers are positioned on opposite sides of the armature flange. The first and second washers are structurally support opposite sides by the pin flange and the bolt flange thereby providing lateral support to the armature at the armature flange. A sensor is connected to the differential case. The sensor is located a fixed, predetermined distance from the differential case. The sensor is to detect a proximity of the armature position indicator arm to the sensor and to output an electrically detectable signal indicative of an engagement status of the lock collar.

In additional features, the locking differential assembly further includes a stator, a plurality of anti-rotation rails and a plurality of anti-rotation receivers. The stator defines a coil cavity configured to receive the coil. The plurality of anti-rotation rails project from the stator. The plurality of anti-rotation receivers are connected to the armature. The anti-rotation receivers are complementary to the anti-rotation rails. The anti-rotation rails are received by the anti-rotation receivers to prevent relative rotation between the stator and the armature. In examples, the anti-rotation rails include rectangular tabs. The anti-rotation receivers include slots defined in the armature. The slots are configured to slidingly receive the rectangular tabs. In additional features, each relay pin includes a post having a reduced diameter portion relative to a remainder of the relay pin. The post can be concentric with the remainder of the relay pin.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to locking differentials, and more particularly to electronically controlled locking differentials used in vehicle drive axles. As used herein, an electronically controlled locking differential means a differential that changes between an unlocked state and a locked state in response to an electronic signal. In the locked state, both axle shafts connected to the differential rotate together in the same direction, at the same speed. The electronic signal may be automatically produced in response to a vehicle condition, for example, detection of wheel slippage. The electronic signal may also be produced in response to a demand from an operator, for example, an operator may press a button or actuate a switch on a control panel of the vehicle.

Examples of the present disclosure may allow the differentials to operate at a higher torque than similarly sized existing locking differentials. Further, the status indicator may provide a more satisfactory user experience by providing more detailed and accurate information regarding the operation of the electronically controlled locking differential system of the present disclosure. For example, in applications where the locking differential is installed on a steering axle, e.g., on the front axle of a front wheel drive vehicle, operating in the locked state may change the steering dynamics of the vehicle. As such, examples of the present disclosure may quickly provide an indication of the engagement status of the locking differential.

Figure 1:
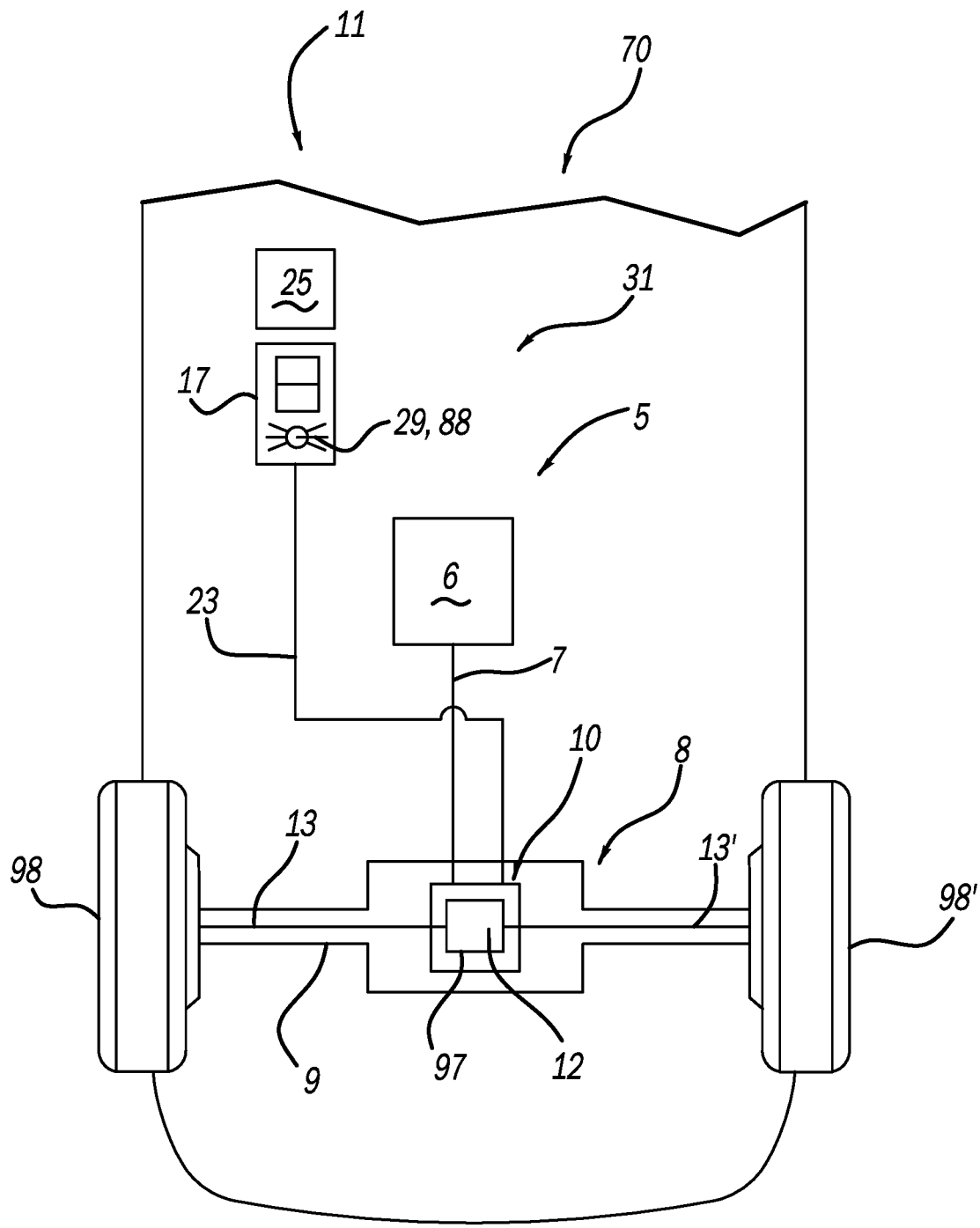
FIG. 1 is a schematic view of a motor vehicle with a locking differential system according to an example of the present disclosure.
Figure 2:
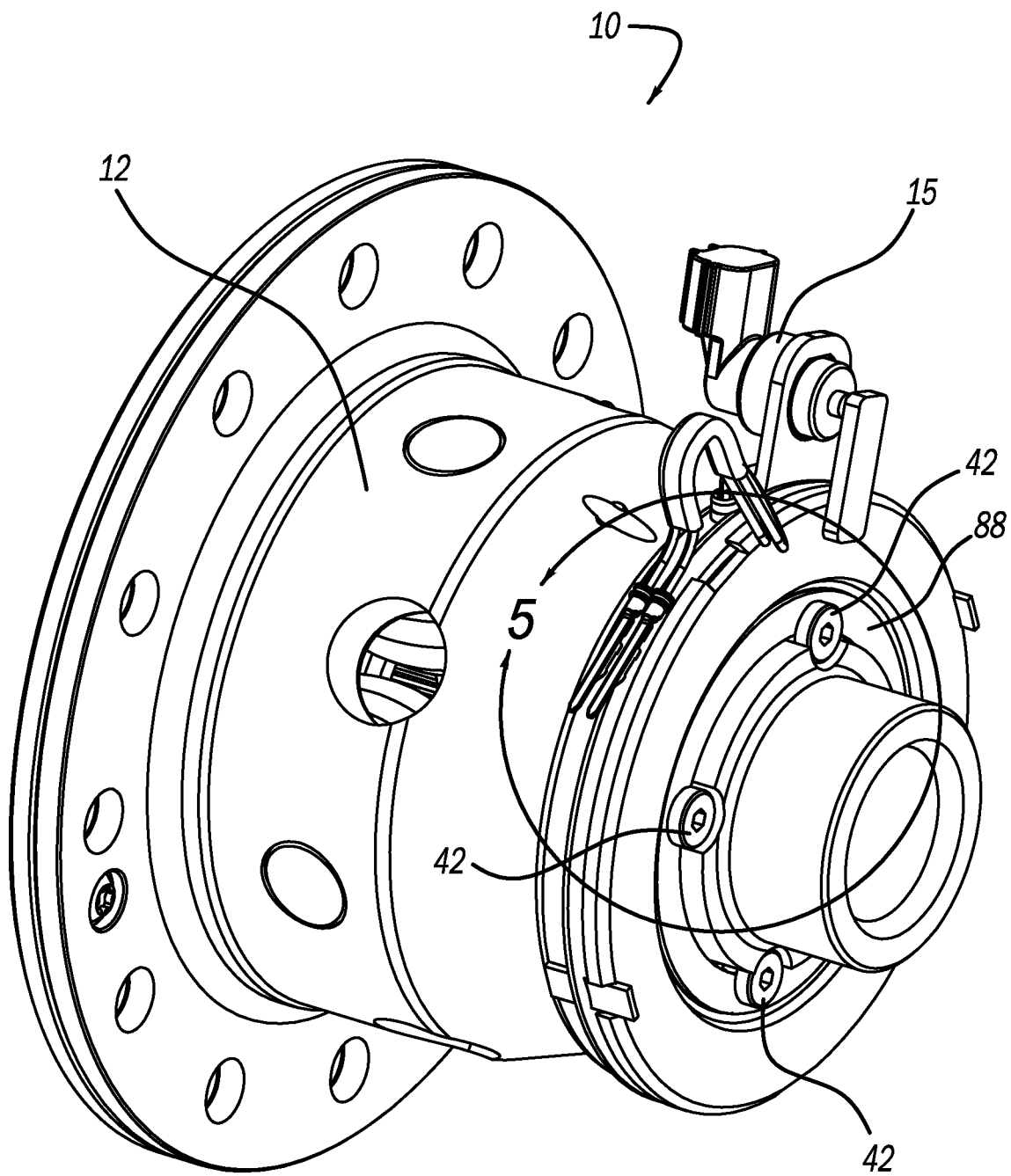
FIG. 2 is a perspective view of a locking differential according to an example of the present disclosure.
Figure 3:
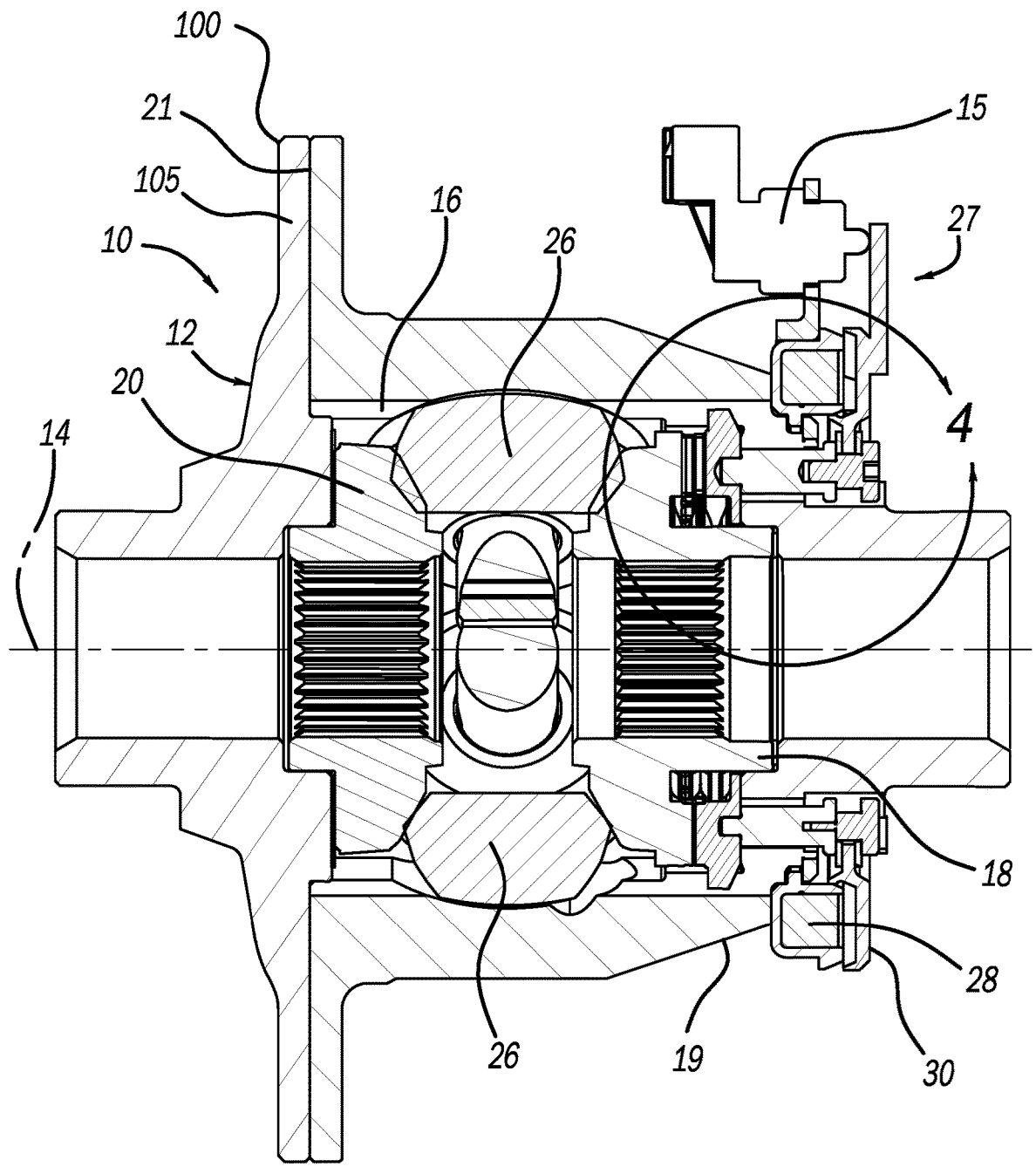
FIG. 3 is a cross-sectional rear view of the locking differential depicted in FIG. 2.

Referring to FIG. 1, a powertrain 5 for a vehicle 70 includes a motor 6, a propeller shaft 7 connected to the motor and an axle assembly 8. The propeller shaft 7 is connected, for example, by gearing (not shown) to rotationally drive the axle shafts 13, 13' inside the axle housing 9. The axle assembly 8 includes the axle housing 9, a locking differential assembly 10 supported in axle housing 9 and the axle shafts 13, 13' respectively connected to first and second drive wheels 98 and 98'. The axle housing 9 may be part of a transaxle. A gearset 97 disposed within a differential case 12 transfers rotational power from differential case 12 to the axle shafts 13, 13', and selectably allows relative rotation between the axle shafts 13 and 13'. The locking differential assembly 10 of the present disclosure may be included in rear axles for rear-wheel drive vehicles, transaxles for use in front-wheel drive vehicles, transfer cases for use in four-wheel drive vehicles or in any vehicle powertrain. Moreover, it is contemplated that the motor 6 can be any motor such as an internal combustion engine, an electric motor, combinations thereof, or any device configured to impart rotational movement onto the propeller shaft.

Referring to FIGS. 2, 3, 4, 5, 6 and 7 together, an example of the present disclosure is depicted including a locking differential assembly 10. The locking differential assembly 10 has a differential case 12 defining an axis of rotation 14 and a gear chamber 16. The differential case 12 rotates in the axle housing 9 (see FIG. 1) about the axis of rotation 14. A first side gear 20 is disposed at a first end 21 of the differential case 12 for selectable relative rotation thereto. A second side gear 18 is disposed at a second end 19 of the differential case 12 opposite the first end 21 for selectable rotation relative to the differential case 12.

The second side gear 18 has side gear dogs 22 defined on a back face 24 of the second side gear 18. The back face 24 of the second side gear 18 is opposite to a gear tooth face 66 of the second side gear 18. At least two pinion gears 26 are rotatably supported in the gear chamber 16. Each of the at least two pinion gears 26 is in meshing engagement with the first side gear 20 and the second side gear 18.

Figure 4:
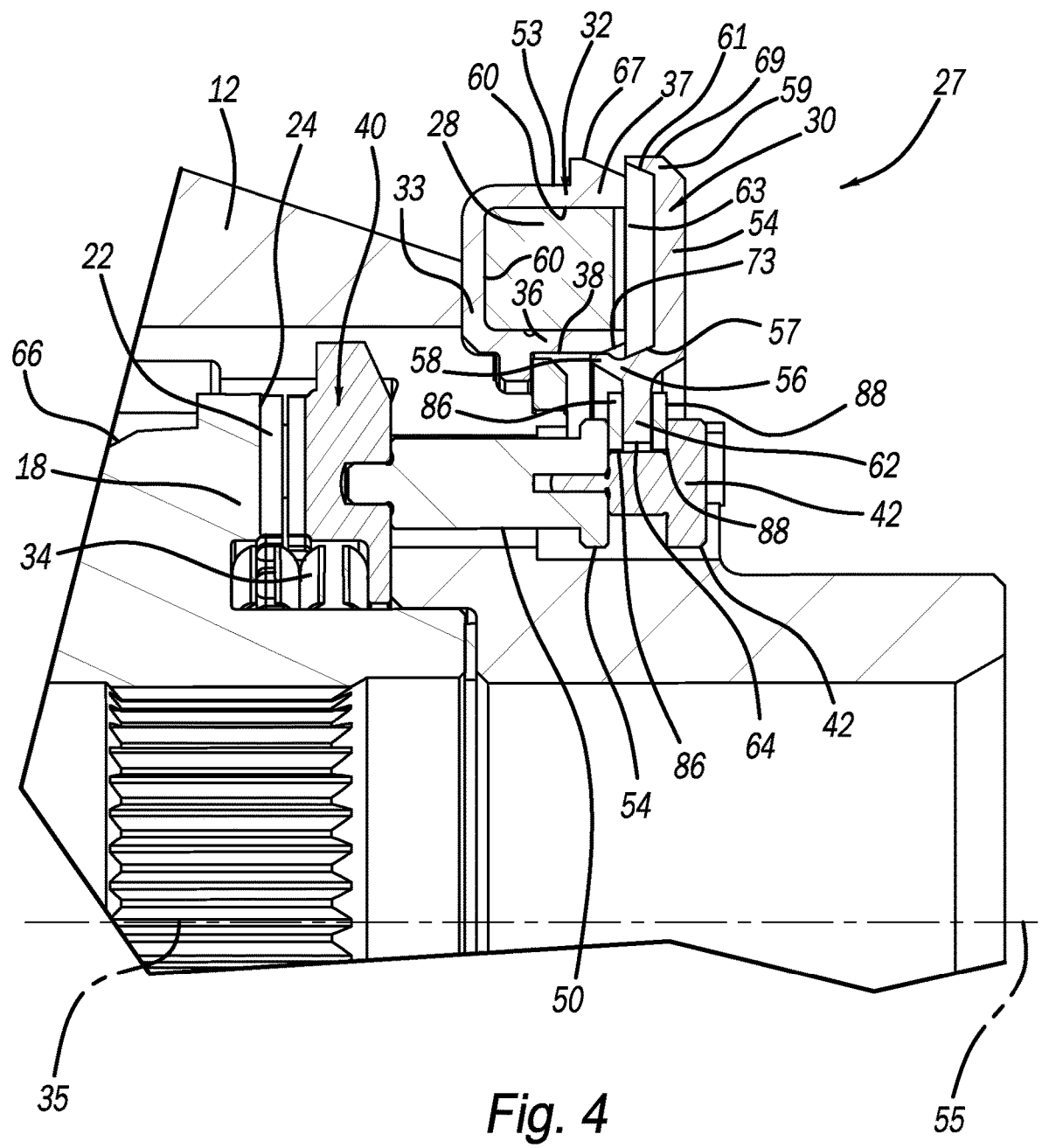
FIG. 4 is a detail cross-sectional rear view of the portion of the locking differential indicated in FIG. 3.
Figure 5:
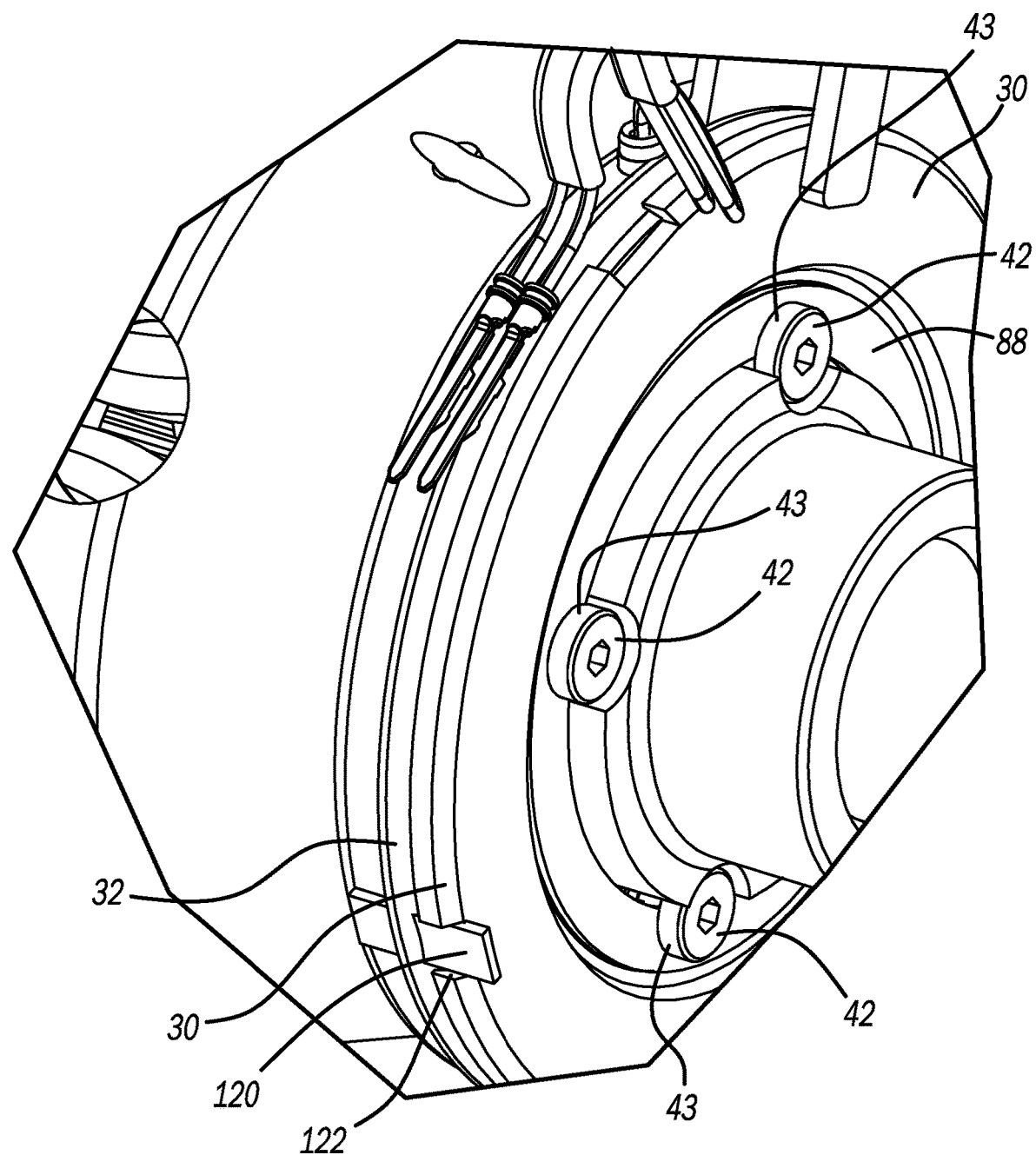
FIG. 5 is a detail perspective view of the portion of the locking differential indicated in FIG. 2.
Figure 6:
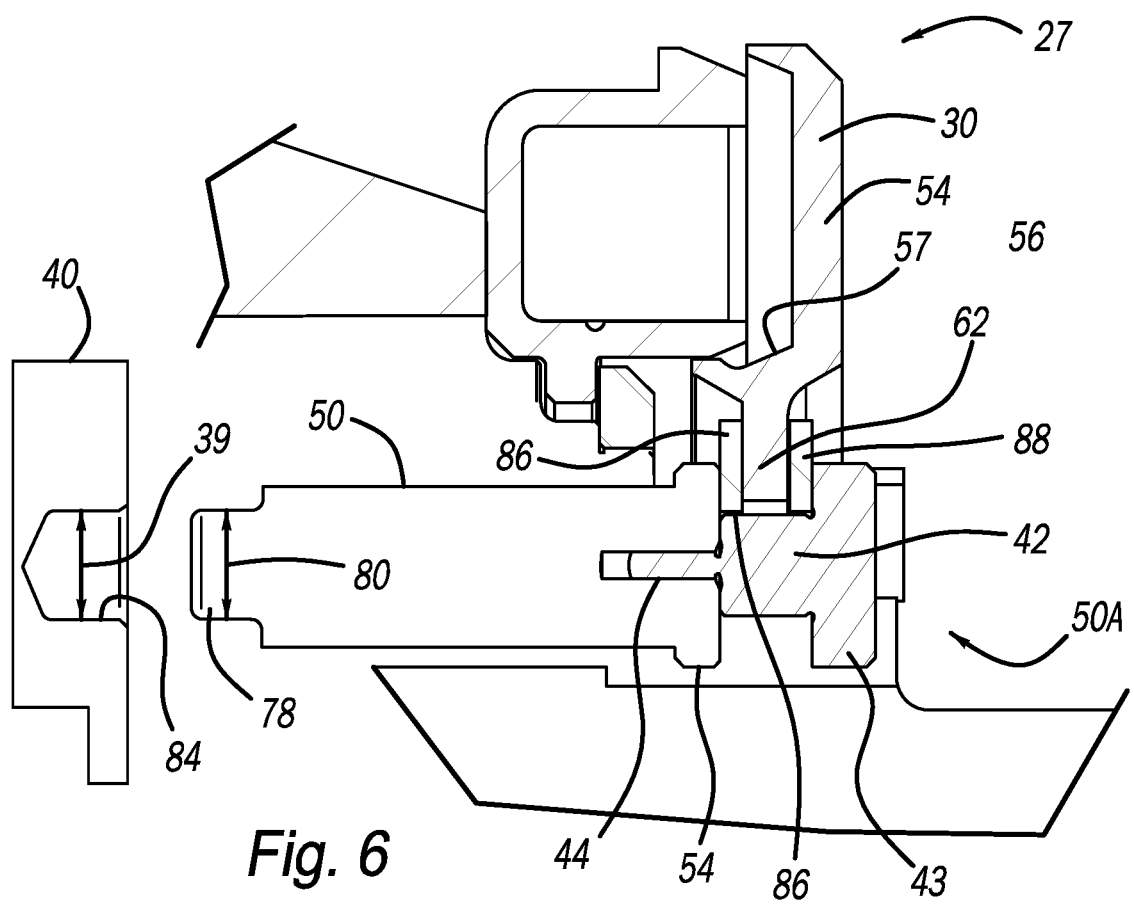
FIG. 6 is a detail cross-sectional rear view from FIG. 4 with an exploded view of the relay pin to lock collar joint.

The locking differential assembly 10 includes a lock actuation mechanism 27 generally comprising an armature 30 and a stator assembly 32. The stator assembly includes an electromagnetic coil 28, disposed at the second end 19 of the differential case 12. The coil 28 is retained in an annular coil cavity 60 defined by a stator 32. The stator 32 is formed from a ferromagnetic material. The differential case 12 is rotatable relative to the stator 32 about the axis of rotation 14. As depicted in FIG. 4 and FIG. 6, the stator 32 has an annular wall 33 with a longitudinal axis 35 coaxial with the axis of rotation 14. A first stator annular flange 36 extends parallel to the longitudinal axis 35 from the annular wall 33 at a first inner diameter 38 of the first stator annular flange 36. The first stator annular flange 36, the annular wall 33, and the second stator annular flange 37 define the annular coil cavity 60. The annular coil cavity 60 has an open end 63 distal to the annular wall 33. Although FIG. 4 and FIG. 6 each depict the first stator annular flange 36 extending parallel to the longitudinal axis 35, the angle that the annular flange 36 makes with the annular wall 33 may deviate from 90 degrees. For example, the angle may be 45 degrees such that the annular coil cavity 60 is wider at the open end 63 than at the annular wall 33. The angle between the first stator annular flange 36 and the annular wall 33 may be any angle so long as the annular coil cavity 60 is defined by the first stator annular flange 36, the annular wall 33, and the second stator annular flange 37.

The second stator annular flange 37 extends from the annular wall 33. The second stator annular flange 37 is spaced from the first stator annular flange 36 and may be parallel to the first stator annular flange 36. The second stator annular flange 37 includes a frusto-conical ridge 67 on the stator outer diameter 53 at the open end 63 of the stator 32. Although FIGS. 4 and 6 depict the annular coil cavity 60 as having a substantially rectangular cross section, the surfaces may be rounded or canted in examples of the present disclosure. In an example, the coil 28 can be wound on a separate bobbin (not shown) and placed into the annular coil cavity 60 via the open end 63. In another example, a bobbinless coil can be used.

FIG. 4 depicts a spring 34 disposed between the second side gear 18 and the lock collar 40 to bias the lock collar 40 toward the disengaged position shown in FIG. 4.

Referring to FIGS. 4 and 6, in examples of the present disclosure, the armature 30 is selectably magnetically actuated by the coil 28. The armature 30 has a ferromagnetic annular body 54. The ferromagnetic annular body 54 has an annular body axis 55 defined by the ferromagnetic annular body 54 to be aligned with the axis of rotation 14. The ferromagnetic annular body 54 has an inner flange 56 having an inner annular bevel 57 at a beveled end 58 of the ferromagnetic annular body 54. The inner annular bevel 57 is parallel to the chamber 73 of the first stator annular flange 36. The ferromagnetic annular body 54 further includes an outer flange 59 having an outer annular bevel 61. An annular armature central flange 62 extends radially inward from the inner flange 56. The annular armature central flange 62 has an armature central flange diameter 64 smaller than the armature outer diameter 69.

In an example, at least two relay pin assemblies 50A are each connected to the lock collar 40 and connected to the armature 30 to space the lock collar 40 a predetermined distance from the armature 30 for translation parallel to the axis of rotation 14. As will be described in greater detail herein, each relay pin assembly 50A comprises a relay pin 50, a shoulder bolt 42, a first washer 86 and a second washer 88.

The lock collar 40 defines a quantity of relay pin attachment bores 84 equal to a quantity of the relay pins 50. The relay pins 50 each define a post 78 configured to be situated in a corresponding attachment bore 84 on the lock collar 40 and an opposite, flange 85 configured on the opposite end. The relay pin attachment bores 84 are centered at a predetermined radius from the axis of rotation 14. Each relay pin 50 is retained in the respective relay pin attachment bore 84. In an example, there are four relay pin assemblies 50A. Other quantities are contemplated.

As depicted in FIG. 6, in an example, a free state post diameter 80 of the post 78 of each relay pin 50 is larger than a free state bore diameter 39 of each relay pin attachment bore 84 to form a press fit between the post 78 of each relay pin 50 and the respective relay pin attachment bore 84. In an example, there is an American National Standards Institute (ANSI) B4.2-1978 H7/s6 medium drive fit between the post 78 of each relay pin 50 and the respective relay pin attachment bore 84. The relay pin assemblies 50A have a shoulder bolt 42 configured to be threadably received in corresponding threaded bores 44 defined in the flange 85 of the relay pin 50. Each shoulder bolt 42 comprises a bolt flange 43.

Figure 7:
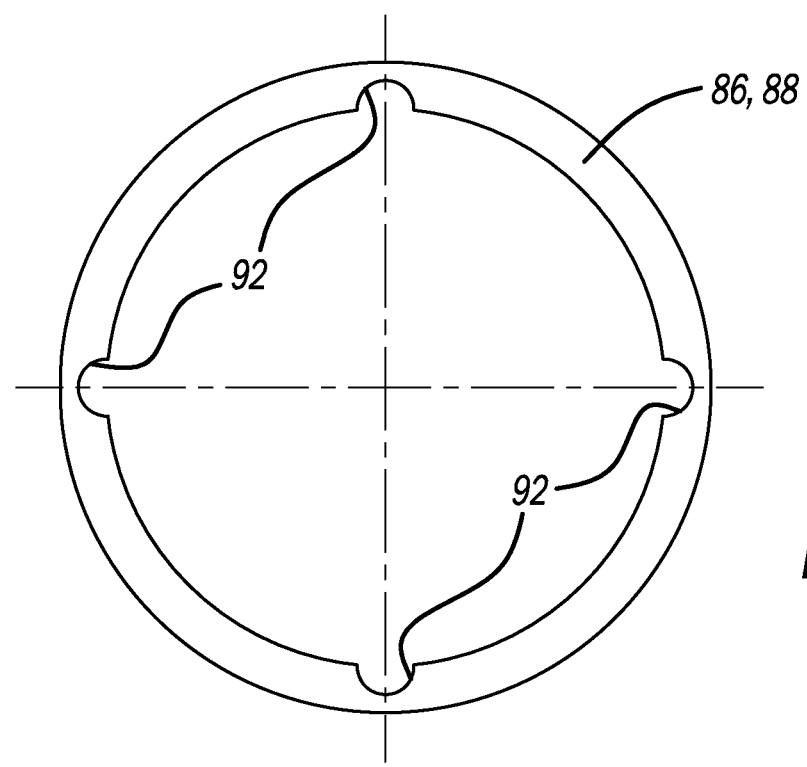
FIG. 7 is a side view of a washer of the locking differential indicated in FIG. 4.

As examples of the present disclosure show in FIGS. 4 and 6, a first washer 86 and a second washer 88 are positioned relative to the armature 30 to provide structural support to the armature 30. The first washer 86 and the second washer 88 are positioned on opposite sides of the annular armature central flange 62 of the armature 30. In this regard, the annular armature central flange 62 is situated between the first and second washers 86, 88. The first washer 86, the annular armature central flange 62 and the second washer 88 are situated between the pin flange 85 of the relay pin 50 and the bolt flange 43 of the shoulder bolt 42. As a result, the first and second washers 86, 88, structurally supported on opposite ends by the bolt flange 43 of the shoulder bolt 42 and the pin flange 85 of the relay pin 50 provide robust mechanical and structural lateral support to the armature central flange 62 of the armature 30. In one example of the first washer 86 and the second washer 88 as depicted in FIG. 7, have semi-circular cutouts 92 to fit around a shoulder of the shoulder bolt 42.

In an example, the first washer 86 and the second washer 88 are substantially non-magnetic. In an example, the first washer 86 and the second washer 88 can be American Iron and Steel Institute (AISI) Type 312 Chromium-Nickel steel. Type 312 Chromium-Nickel steel is an austenitic stainless steel and is therefore substantially non-magnetic. Therefore, the bobbinless first washer 86 and the second washer 88 made from Type 312 Chromium-Nickel steel is substantially non-magnetic. As used herein, substantially non-magnetic means having a relative permeability of less than 1.1. Relative permeability as used herein means a dimensionless ratio of permeability of a specific medium to the permeability of free space. The permeability of free space is $4\pi \times 10^{-7}$ Newton Ampere-2. Compared to a magnetic first washer 86 and second washer 88, a substantially non-magnetic first washer 86 and second washer 88 has a smaller potential for the first washer 86 and the second washer 88 to interfere with the magnetic circuit that draws the armature 30 toward the stator 32 when the coil 28 is energized.

In examples of the present disclosure, the armature 30 is selectably translatable relative to the stator 32 along the axis of rotation 14.

In examples of the present disclosure, the sensor 15 may use any position sensor technology, including, but not limited to contact switches and non-contacting sensors. For example, a sensor 15 based on magnetostriction, magnetoresistance, Hall-Effect, or other magnetic sensing technologies may be included in the locking differential assembly 10 according to the present disclosure. In an example, the sensor may be a Hall-Effect sensor. In another example, the sensor may be a variable reluctance sensor. In another example, the sensor 15 may be a normally open or a normally closed contact switch.

In examples of the present disclosure, a locking differential system 11 (e.g., FIG. 1) includes the locking differential assembly 10 as disclosed above. The locking differential system 11 also includes an electrical switch 17 to selectably close a circuit 23 to provide electrical power to the coil. The electrical switch 17 shown in FIG. 1 is a rocker switch, however any switch capable of controlling the flow of power through the coil may be used. The electrical switch 17 may be a low current switch that controls a relay or transistor that directly controls power through the coil 28. The differential system 11 also includes an electronic status indicator 29. Still further, the differential system 11 includes an electronic driver circuit 25 for powering the electronic status indicator 29 to indicate a status of the locking differential system 11. In examples of the present disclosure, the electronic driver circuit 25 may include an electronic control unit (ECU) in communication with the sensor 15 to receive the electrically detectable signal indicative of the engagement status of the lock collar 40. The ECU is to determine the status of the locking differential system 11 based on the electrically detectable signal output by the sensor 15. The determination of the status of the locking differential system 11 by the ECU may be based on signals and information other than or in addition to the electrically detectable signal output by the sensor 15. For example, if vehicle battery power is low, the ECU may determine that the locking differential system 11 is in an error state. The ECU may output the status to another portion of the electronic driver circuit 25 for powering the electronic status indicator 29 to indicate the status of the locking differential system 11.

In some examples the status may include at least two states (locked, unlocked). In other examples, the status may include at least three states for example, the electronic status indicator 29 may be a selectably illuminated indicator 88, and the status may be indicated by a flash code. To illustrate, the selectably illuminated indicator 88 may include a light emitting diode, incandescent lamp, fluorescent lamp, or other selectably illuminable light source. It is to be understood that the electronic status indicator 29 may be any suitable indicator, for example, the electronic status indicator may be integrated into a graphic display. In examples in which the electronic status indicator 29 is a visual indicator, the visual indicator may be located on a dashboard, in an instrument cluster, on a mirror, on a steering wheel, on a shift control lever or button, on a console, on a sun visor, on a head up display, on a windshield, on a wearable device including a head mounted display, or any location visible to the operator of the vehicle while operating the vehicle. Further, the electronic status indicator 29 is not limited to visual indication; the electronic status indicator 29 may include an audible indicator (e.g., beep, buzz, tone, synthetic speech), haptic indicator (e.g., vibrating seat, steering wheel, or shift lever), or any electronic status indicator 29 audible to, or otherwise perceivable by, the operator of the vehicle while operating the vehicle.

An example of a flash code may be as follows: the first state is indicated by not illuminating the electronic status indicator 29; the second state is indicated by continuously illuminating the electronic status indicator 29; and the third state is indicated by sequentially illuminating and not illuminating the electronic status indicator 29 with about a 50 percent duty cycle at a frequency between 1 and 20 hertz. In an example, "On" means the electronic status indicator 29 is illuminated, and "Off" means the electronic status indicator 29 is not illuminated. States other than the three states in the example above, for example, error conditions, may be indicated by predetermined sequences of illuminating and not illuminating the electronic status indicator 29. An electronic diagnostic system (not shown) may be connected to the locking differential system 11 to determine if error conditions exist. For example, the electronic driver circuit 25 may include an ECU. The ECU may perform diagnostics based on inputs that include the electrically detectable signal output by the sensor 15. The ECU may execute instructions embedded in a non-transitory, tangible memory device. The ECU may include analog circuitry, digital electronic elements and/or a digital computer processor for performing diagnostics, which may include determining the status of the locking differential system 11.

In an example, the status is selected from the group consisting of a first state, a second state, and a third state. In the example, the first state is a disengaged state having the electrical switch 17 in an open condition to disconnect power to the coil 28 and the lock collar 40 is in the disengaged position. The second state is an engaged state having the electrical switch 17 in a closed condition connecting power to the coil 28 and the lock collar 40 is in the engaged position. The third state is a transition state having the electrical switch 17 in an open condition disconnecting power to the coil 28 and the lock collar 40 is in the engaged position or the electrical switch 17 is in a closed condition connecting power to the coil 28 and the lock collar 40 is in the disengaged position. Indicating the transition state may reduce a tendency for an operator to continue to press a differential lock control button, or press the button harder, while the locking differential system 11 is in the transition state.

Returning to FIG. 5, additional features of the instant disclosure will be described. A plurality of anti-rotation rails 120 project from the stator 32. A corresponding plurality of anti-rotation receivers 122 are connected to the armature 30. The anti-rotation receivers 122 are complementary to the anti-rotation rails 120. The anti-rotation rails 120 are received by the anti0rotation receivers 122 to prevent relative rotation between the stator 32 and the armature 30. In examples, the anti-rotation rails 120 include rectangular tabs and the anti-rotation receivers 122 include slots defined in the armature 30. The slots are configured to slidingly receive the rectangular tabs.

In some examples, the coil 28 can be referred to as a solenoid or other mechanism or device capable of influencing movement onto the armature 30. It is to be understood that the terms "connect/connected/connection" and/or the like are broadly defined hereinto encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that any ranges provided herein include the stated range and any value or sub-range within the stated range.

Furthermore, when "about" is utilized to describe a value, this is meant to encompass minor variations (up to +/−10%) from the stated value.

Still further, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A locking differential assembly, comprising:
   a differential case defining an axis of rotation;
   a first side gear;
   a lock collar selectably engageable with a second side gear to selectably prevent the first side gear and the second side gear from rotating relative to the differential case;
   a coil disposed at an end of the differential case;
   an armature selectably magnetically actuatable by the coil, the armature including an armature flange;
   an armature position indicator arm rigidly attached to the armature for simultaneous movement with the armature;
   at least two relay pin assemblies each connected to the lock collar and connected to the armature to space the lock collar a predetermined distance from the armature for translation parallel to the axis of rotation, each relay pin assembly comprising:
      a relay pin having a pin flange;
      a shoulder bolt having a bolt flange;
      a first washer; and
      a second washer, wherein the first washer and the second washer are positioned on opposite sides of the armature flange, the first and second washers structurally supported on opposite sides by the pin flange and the bolt flange thereby providing lateral support to the armature at the armature flange; and
   a sensor connected to the differential case, wherein:
      the sensor is located a fixed, predetermined distance from the differential case; and the sensor is to detect a proximity of the armature position indicator arm to the sensor and to output an electrically detectable signal indicative of an engagement status of the lock collar.

2. The locking differential assembly as defined in claim 1, further comprising: a stator defining a coil cavity to receive the coil, wherein the sensor is attached to the stator.

3. The locking differential assembly as defined in claim 2 wherein the sensor is welded to the stator.

4. The locking differential assembly as defined in claim 1, further comprising:
   side gear dogs defined on a back face of the second side gear, the back face opposite to a gear tooth face of the second side gear;
   complementary dogs defined on an engagement face of the lock collar, the complementary dogs selectably engageable with the side gear dogs by translating the lock collar along the axis of rotation from a disengaged position to an engaged position; and a spring disposed between the second side gear and the lock collar to bias the lock collar toward the disengaged position, wherein the lock collar is fixed for rotation with the differential case, wherein the lock collar is to selectably translate relative to the differential case along the axis of rotation, wherein the second side gear is substantially prevented from rotating relative to the differential case when the lock collar is in the engaged position, wherein the second side gear is free to rotate relative to the differential case when the lock collar is in the disengaged position.

5. The locking differential assembly as defined in claim 1, further comprising:
   a stator defining a coil cavity to receive the coil;
   a plurality of anti-rotation rails projecting from the stator; and
   a plurality of anti-rotation receivers connected to the armature, wherein the anti-rotation receivers are complementary to the anti-rotation rails, wherein the anti-rotation rails are received by the anti-rotation receivers to prevent relative rotation between the stator and the armature.

6. The locking differential assembly as defined in claim 5 wherein the anti-rotation rails include rectangular tabs, and the anti-rotation receivers include slots defined in the armature, wherein the slots are to slidingly receive the rectangular tabs.

7. The locking differential assembly as defined in claim 5 wherein the armature comprises a ferromagnetic annular body having the armature flange.

8. The locking differential assembly as defined in claim 7 wherein the at least two relay pin assemblies connect the armature flange to drive the lock collar toward engagement with the second side gear when the coil is energized.

9. The locking differential assembly as defined in claim 1 wherein each relay pin comprises:
   a post having a reduced diameter portion relative to a remainder of the relay pin, the post being concentric with the remainder of the relay pin.

10. The locking differential assembly as defined in claim 9 wherein the lock collar defines a quantity of relay pin attachment bores equal to a quantity of the relay pin assemblies, wherein each relay pin is retained in the respective relay pin attachment bore.

11. The locking differential assembly as defined in claim 10 wherein a free state post diameter of the post of each relay pin assembly is larger than a free state bore diameter of each relay pin attachment bore to form a press fit between the post of each relay pin assembly and the respective relay pin attachment bore when each relay pin assembly is installed in the respective relay pin attachment bore.

12. The locking differential assembly as defined in claim 9, wherein each relay pin assembly further comprises:
   a threaded end defined on the relay pin; and
   a threaded bore defined in the pin flange of the relay pin, wherein the shoulder bolt is threadingly attached to the relay pin.

13. The locking differential assembly as defined in claim 12, wherein the first washer and the second washer have semi-circular cutouts to fit around the bolt flange of each of the shoulder bolts.

14. The locking differential assembly as defined in claim 13 wherein the first washer and the second washer are non-magnetic.

15. The locking differential assembly as defined in claim 13 wherein the first washer or the second washer are magnetizable.

16. The locking differential assembly as defined in claim 1 wherein the at least two relay pin assemblies are a quantity of three relay pin assemblies.

17. An axle assembly for a motor vehicle, comprising:
   an axle housing having a locking differential assembly supported therein;
   a first axle half-shaft having a first axle half-shaft splined end extending into the axle housing;
   a second axle half-shaft having a second axle half-shaft splined end extending into the axle housing;
   the locking differential assembly including:
   a differential case defining an axis of rotation;
   a first side gear
   a lock collar selectably engageable with a second side gear to selectably prevent the first side gear and the second side gear from rotating relative to the differential case;
   a coil disposed at an end of the differential case;
   an armature selectably magnetically actuatable by the coil wherein the armature comprises a ferromagnetic annular body having an armature flange;
   a first washer and a second washer having the armature flange sandwiched therebetween;
   an armature position indicator arm rigidly attached to the armature for simultaneous movement with the armature; and
   at least two relay pin assemblies each connected to the lock collar and connected to the armature to space the lock collar a predetermined distance from the armature for translation parallel to the axis of rotation;
   a sensor connected to the differential case, wherein:
   the sensor is located a fixed, predetermined distance from the differential case; and
   the sensor is to detect a proximity of the armature position indicator arm to the sensor and to output an electrically detectable signal indicative of an engagement status of the lock collar.

18. The axle assembly as defined in claim 17, further comprising:
   side gear dogs defined on a back face of the second side gear, the back face opposite to a gear tooth face of the second side gear;
   complementary dogs defined on an engagement face of the lock collar, the complementary dogs selectably engageable with the side gear dogs by translating the lock collar along the axis of rotation from a disengaged position to an engaged position; and
   a spring disposed between the second side gear and the lock collar to bias the lock collar toward the disengaged position;
   wherein the lock collar is fixed for rotation with the differential case, wherein the lock collar is to selectably translate relative to the differential case along the axis of rotation, wherein the second side gear is substantially prevented from rotating relative to the differential case when the lock collar is in the engaged position, wherein the second side gear is free to rotate relative to the differential case when the lock collar is in the disengaged position.

19. The axle assembly as defined in claim 17, further comprising:
   a stator defining a coil cavity to receive the coil;
   a plurality of anti-rotation rails projecting from the stator; and
   a plurality of anti-rotation receivers connected to the armature, wherein the anti-rotation receivers are complementary to the anti-rotation rails, wherein the anti-rotation rails are received by the anti-rotation receivers to prevent relative rotation between the stator and the armature.

20. The axle assembly as defined in claim 19 wherein the sensor is attached to the stator.

\* \* \* \* \*